US005559074A

United States Patent [19]

Watanabe et al.

[11] Patent Number: 5,559,074
[45] Date of Patent: Sep. 24, 1996

[54] HEAT-SENSITIVE STENCIL SHEET

[75] Inventors: Hideo Watanabe; Sadanao Okuda, both of Tokyo, Japan

[73] Assignee: Riso Kagaku Corporation, Tokyo, Japan

[21] Appl. No.: 420,036

[22] Filed: Apr. 11, 1995

[30] Foreign Application Priority Data

Apr. 13, 1994 [JP] Japan .................................... 6-074972

[51] Int. Cl.$^6$ ........................................ G01B 3/14

[52] U.S. Cl. .......................... 428/447; 33/563; 428/195; 428/704; 428/913; 428/914

[58] Field of Search ................................ 428/195, 447, 428/704, 913, 914

[56] References Cited

U.S. PATENT DOCUMENTS

| | | | |
|---|---|---|---|
| 4,957,808 | 9/1990 | Arai et al. | 428/262 |
| 5,149,765 | 9/1992 | O'Lenick, Jr. | 528/25 |

FOREIGN PATENT DOCUMENTS

| | | | |
|---|---|---|---|
| 307475 | 3/1989 | European Pat. Off. | 428/195 |
| 71.13154 | 1/1972 | France | 428/195 |
| 3830775 | 3/1989 | Germany | 428/262 |
| 58-238983 | 12/1983 | Japan | 428/195 |

*Primary Examiner*—Bruce H. Hess
*Attorney, Agent, or Firm*—Fay, Sharpe, Beall, Fagan, Minnich & McKee

[57] ABSTRACT

Disclosed is a heat-sensitive stencil sheet having its perforating and separating properties in the case of doing stencil-making by thermal heads and not allowing a releasing layer thereof to transfer to the other stencil sheet even in the case of stacking the heat-sensitive sheet to each other. The heat-sensitive stencil sheet comprises a porous substrate, a thermoplastic resin film laminated thereon with an adhesive, and a releasing layer provided on the thermoplastic resin film, wherein the releasing layer mainly consists of silicone phosphate.

4 Claims, No Drawings

HEAT-SENSITIVE STENCIL SHEET

BACKGROUND OF THE INVENTION

1. Field of the Invention

The present invention relates to a heat-sensitive stencil sheet. Specifically, it relates to a heat-sensitive stencil sheet which is preferable to stencil-making by perforating the same using a thermal head.

2. Description of the Prior Art

A heat-sensitive stencil sheet is prepared by superimposing a thermoplastic resin film on a porous substrate and adhering to each other with an adhesive. A releasing layer for releasing the thermoplastic film from a thermal head is usually provided on the thermoplastic resin film in order to prevent the lowering of the perforating property on account that the thermoplastic resin film is sticked to the thermal head by heating.

In a prior art, a silicone oil having a releasing property (Japanese patent application laid-open No.58-92595), a cold curing type silicone (Japanese patent application laid-open No.59-218893), a thermosetting type silicone (Japanese patent application laid-open No.61-40196), a ultraviolet light curing type silicone (Japanese patent application laid-open No.62-170392) and others have been used as a releasing layer. The silicone oil and the cold curing type silicone have, however, the problems that these silicone oils are transferred to the porous substrate of the other heat-sensitive stencil sheet, when they are stacked with each other. The thermosetting type silicone also has the problems that the silicone is readily transferrable to the laminated porous substrate, wrinkle appears on the surface of the thermoplastic resin film by heating and the heat-sensitive stencil sheet is curled. The ultraviolet light curing type silicone has the disadvantage that a curing failure can be easily occurred when reaction inhibiting materials are intermingled therein.

Some methods have been known that an antistatic agent (Japanese patent application laid-open No.2-9689) and a surface active agent (Japanese patent application laid-open No.60-109888) are coated on the surface of the thermoplastic resin film. These methods are effective to the electrostatic prevention, but they do not give their satisfactory effect to the releasing property of the thermoplastic resin film from the thermal head, resulting in producing nonuniformity in coating them on the thermoplastic resin film.

Furthermore, as a releasing layer, some materials having a melting property, such as higher fatty acid metal salts (Japanese patent application laid-open No.60-19592) and higher fatty acid esters (Japanese patent application laid-open No.63-69695), are also known to be used, but there are the problems that the releasing property is still unsatisfactiory and the molten materials of the thermoplastic resin film are adhered to the thermal head as a residue, resulting in generating stencil-making failures.

SUMMARY OF THE INVENTION

It is, accordingly, an object of the present invention to solve the problems of the prior art described above and provide a heat-sensitive stencil sheet having an excellent perforating and releasing properties in the case of stencil-making by using the thermal head and such a releasing layer as being not transferred to the other stencil sheet even in the case of stacking the stencil sheets.

The invention to be claimed mainly for patent in the present application will be as follows:

1. A heat-sensitive stencil sheet comprising a porous substrate, a thermoplastic resin film laminated thereon with an adhesive and a releasing layer provided on the thermoplastic resin film, wherein the releasing layer comprises silicone phosphate.
2. A heat-sensitive stencil sheet according to item 1, wherein the silicone phosphate is a copolymer of dimethyl polysiloxane with polyol phosphate presented by the following formula (I):

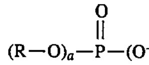

(I)

wherein a and b are integers of 1 or 2, a+ b is equal to 3, M represents either of H, Na, K, Li and $NH_4$, and R is expressed either by the following formula (II) in the case of introducing polyol phosphate to the side chains of dimethyl polysiloxane or by the following formula (III) in the case of introducing polyol phosphate to the end of dimethyl siloxane:

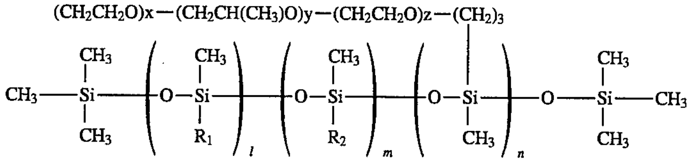

(II)

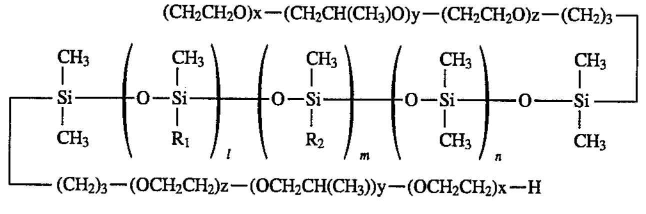

(III)

wherein x, y and z are defined as the numbers in the range of 0–20, respectively, x+ y+ z is defined by a number in the range of 1–5, 1, m and n are defined by the numbers in the range of 0–200, respectively, R, is represented by $—(CH_2)_pCH_3$, wherein p shows a number in the range of 0–10, and $R_2$ is represented by $—(CH_2)_3—(OCH_2CH_2)_s—(OCH_2CH(CH_3))_r—(OCH_2CH_2)_qOH$, wherein q, r and s are defined as the numbers in the rangeof 0–20, respectively.

3. A heat-sensitive stencil sheet according to item 1, wherein the silicone phosphate is dimethicone copolyol phosphate.
4. A heat-sensitive stencil sheet comprising a thermoplastic resin film with a releasing layer thereon, wherein the releasing layer comprises silicone phosphate.

As a specific example of silicone phophate, there is exemplified dimethicone copolyol phosphate and others. The releasing layer can include a releasing agent except the silicone phosphate described above, such as silicone oil, antistatic agent, thermally molten material, resin, and others to the extent that the object of the present invention may not be obstructed. It is usually considered from the standpoints of perforating and releasing properties that the releasing layer may have a thickness in the range of 0.001–0.5 $g/m^2$. It eventually happened that the releasing layer results in the inferior releasing property thereof, if the thickness is less than 0.001 $g/m^2$, or the inferior perforating property, if the thickness is above 0.5 $g/m^2$, respectively.

Since silicone phosphate is provided with an excellent releasing and lubricating abilities due to silicone component as well as an excellent antistatic property and absorbability on a base material due to phosphate ester, a releasing layer having the excellent properties described above can be obtained by coating silicone phosphate on the thermoplastic resin film of the heat-sensitive stencil sheet. As silicone phosphate is in a liquid state at ordinary temperatures, no molten materials deposit onto the surface of the thermal head.

As a thermoplastic resin film used in the present invention, there is, for example, exemplified polyester film, polycarbonate film, polypropylene film, polyvinyl chloride film, polyvinyl chloride—polyvinylidene chloride copolymer film or the like, and it is considered that the thickness of each film is usually 10 μm or less and preferably in the range of 0.5–6.0 μm.

As a porous substrate used in the present invention, there is exemplified Japanese paper using natural fibers such as Manila hemp, pulp, Mitsumata (*Edgeworthia papyrifera* Sieb.), Kozo (*Broussonetia kazinoki* Sieb.), synthetic fibers, such as that of polyester, nylon, vinylon, acetate fiber or the like, fibrics or non-woven cloth using metallic fiber, glass fiber or the like. These porous substrates can be used independently or in the combination of two or more kinds thereof. Each basis weight of these porous substrates is usually, in the range of 1–20 $g/m^2$ and preferably, in the range of 5–15 $g/m^2$, from the standpoints of the strength of the paper and the permeability of the ink. Also, the thickness of each porous substrate is usually, in the range of 5–100 μm, and preferably, in the range of 10–50 μm, from the similar reason described above.

As an adhesive used in the present invention, there is, for example, epoxy resin, phenol resin, polyvinyl acetate, polyethylene—polyvinyl acetate copolymer, polyvinyl chloride—polyvinyl acetate copolymer, acryl resin, polyester, polyurethane, polystyrene—polybutadiene copolymer, polyisobutylene, polyisoprene rubber, butyl rubber, polyacrylamide, rosin, terpene resin, polystyrene and the like.

DETAILED DESCRIPTION OF THE PREFERRED EMBODIMENTS

The invention will be given specifically with reference to examples in the following. It should be understood, however, that these examples do not limit the scope of the present invention.

EXAMPLE 1

A polyethylene terephthalate film of 2 μm in thickness was superposed on a porous substrate consisting of a Japanese paper of 10 $g/m^2$ in base weight and adhered to each other by using an adhesive of polyethylene—polyvinyl acetate copolymer. Then, a releasing agent solution consisting of 1.0 part by weight of dimethicone copolyol phosphate (Pecosil PS-200,trademark of Phoenix Chemical Incorporated) and 99.0 parts by weight of isopropyl alcohol was coated on the film described above by a wire bar and dried, to give a releasing layer of 0.05 $g/m^2$ in thickness on the polyethylene terephthalate film.

The heat-sensitive stencil sheet thus obtained was applied to stencil-making by a digital stencil-making printing machine, Ringraph RA-205 (trademark of RISO Kagaku Corporation) to examine the perforating property of the heat-sensitive sheet, the releasing properties of the thermoplastic resin film from the thermal head, and the transferring property of the releasing agent in the case of superposing the heat-sensitive stencil sheet on the other. The results thus obtained are shown in Table 1.

EXAMPLE 2

Following the similar procedure as Example 1, except using a mixed solution consisting of 0.8 parts by weight of dimethicone copolyol phosphate (Pecosil WDS-100, trademark of Phoenix Chemical Incorporated), 0.2 parts by weight of silicone resin and 99.0 parts by weight of isopropyl alcohol as a releasing agent solution in Example 1, a heat-sensitive stencil sheet was prepared and the stencil-making was carried out on the resulting sheet by using a word processor (Oaysis 30AX301, trademark of Fujitsu Ltd.). Furthermore, some properties were examined in similar as Example 1 and the results thus obtained were shown in Table 1.

COMPARATIVE EXAMPLE 1

Following the similar procedure as Example 1, except using a mixed solution consisting of 1.0 part by weight of dimethyl silicone oil and 99.0 parts by weight of toluene as a releasing agent solution in Example 1, a heat-sensitive stencil sheet was prepared and some properties were examined in similar as Example 1. The results thus obtained were shown in Table 1.

COMPARATIVE EXAMPLE 2

Following the similar procedure as Example 2, except using a mixed solution consisting of 1.0 part by weight of tri(polyoxyethylene)stearyl ether phosphate and 99.0 parts by weight of isopropyl alcohol as a releasing agent solution in Example 2, to give 0.1 $g/m^2$ of a releasing layer, a heat-sensitive stencil sheet was prepared and some properties were examined in similar as Example 2. The results thus obtained were shown in Table 1.

COMPARATIVE EXAMPLE 3

Following the similar procedure as Example 2, except using a mixed solution consisting of 1.0 part by weight of thermosetting silicone resin and 99.0 parts by weight of toluene as a releasing agent solution in Example 2 to give 0.1 $g/m^2$ of a releasing layer, a heat-sensitive stencil sheet was prepared and some properties were examined in similar as Example 2. The results thus obtained were shown in Table 1.

TABLE 1

| | perforating property*1 | releasing property*2 | transferring property*3 |
|---|---|---|---|
| Example 1 | A | A | A |
| Example 2 | A | A | A |
| Comparative Example 1 | A | A | C |
| Comparative Example 2 | A | B | A |
| Comparative Example 3 | C | C | A |

Note:
*1(perforating property): the perforated film condition by the thermal head was visually observed and evaluated by marking with "A" for good perforation and with "C" for perforation failure, respectively.
*2(releasing property): the condition of the thermal head to the film as to sticking of the melted film thereto was examined and evaluated by marking with "A" for its absence, with "B" for its minor presence and with "C" for its major presence.
*3(transferring property): an examination was made for the transferred condition of the releasing agent to the porous substrate in the case of stacking a heat-sensitive stencil sheet thereon and the resulting evaluation was shown by "A" for its absence and "C" for its presence.

It is found from Table 1 that the heat-sensitive stencil sheet according to the present invention is excellent in its perforating, releasing and transferring properties.

EFFECTIVENESS OF THE INVENTION

Since the heat-sensitive stencil sheet according to the present invention has a releasing layer of silicone phosphate on a thermoplastic resin film having both characteristics of the releasing and lubricating properties due to a silicone component and the antistatic properties and the absorbability on the base material due to the phosphate part, the heat-sensitive stencil sheet is excellent in its perforating and releasing properties, and even in the case of stacking the heat-sensitive sheet thereon, it is excellent in its handling property because the releasing agent does not transfer to the other sheet.

What we claimed is:

1. A heat-sensitive stencil sheet comprising a porous substrate, a thermoplastic resin film laminated thereon with an adhesive and a releasing layer provided on said thermoplastic resin film, wherein said releasing layer comprises silicone phosphate.

2. A heat-sensitive stencil sheet according to claim 1, wherein said silicone phosphate is a copolymer of dimethyl polysiloxane with polyol phosphate represented by the following formula (I):

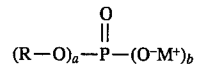
(I)

wherein a and b are integers of 1 or 2, a+ b is equal to 3, M represents either of H, Na, K, Li and $NH_4$, and R is expressed either by the following formula (II) in the case of introducing polyol phosphate to the side chains of dimethyl polysiloxane or by the following formula (III) in the case of introduction polyol phosphate to the end of dimethyl siloxane:

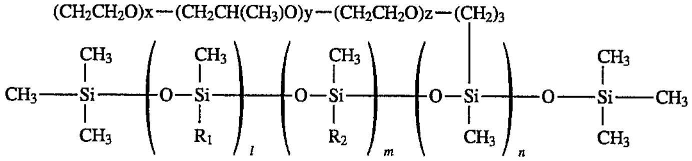
(II)

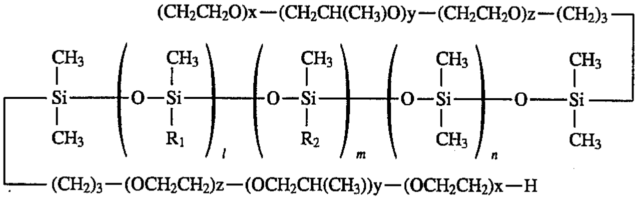
(III)

wherein x, y and z are defined as the numbers in the range of 0–20, respectively, x+ y+ z is defined by a number in the rage of 1–5, 1, m and n are defined by the numbers in the range of 0–200, respectively, R, is represented by $—(CH_2)_pCH_3$, wherein p shows a number in the range of 0–10, and $R_2$ is represented by $—(CH_2)_3—(OCH_2CH_2)_s—(OCH_2CH(CH_3))_r—(OCH_2CH_2)_qOH$, wherein q, r and s are defined as the numbers in the range of 0–20, respectively.

3. A heat-sensitive stencil sheet according to claim 1, wherein said silicone phosphate is dimethicone copolyol phosphate.

4. A heat-sensitive stencil sheet comprising a thermoplastic resin film with a releasing layer thereon, wherein said releasing layer comprises silicone phosphate.

* * * * *